UNITED STATES PATENT OFFICE.

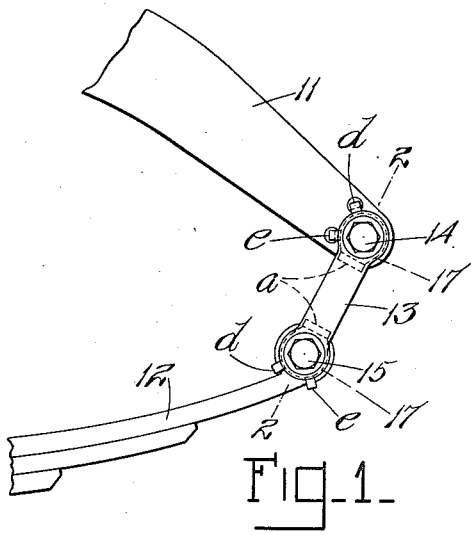
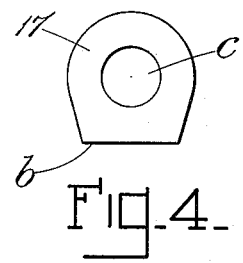
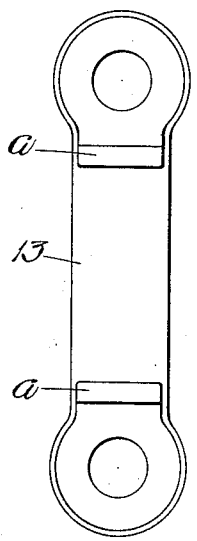
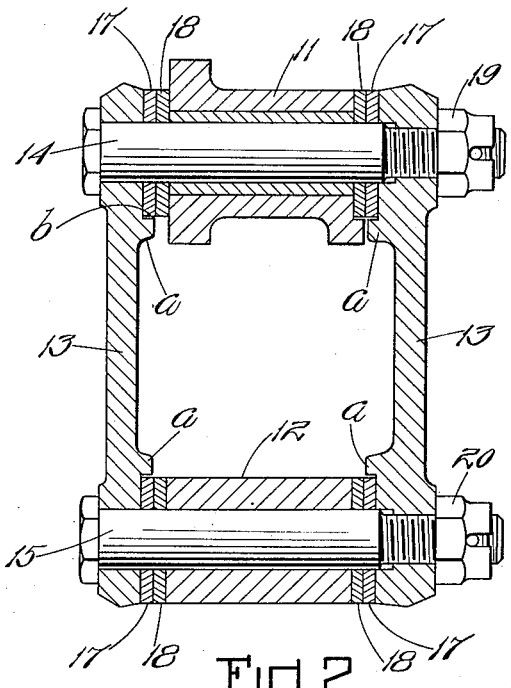
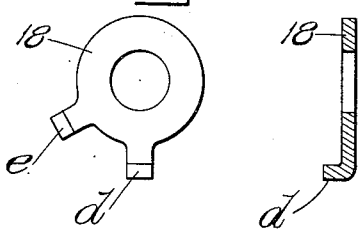

STEPHEN I. FEKETE, OF DETROIT, MICHIGAN, ASSIGNOR TO ESSEX MOTORS, OF DETROIT, MICHIGAN, A CORPORATION OF MICHIGAN.

SPRING-SHACKLE FOR MOTOR-VEHICLES.

1,376,803.

Specification of Letters Patent.

Patented May 3, 1921.

Application filed November 17, 1919. Serial No. 338,461.

*To all whom it may concern:*

Be it known that I, STEPHEN I. FEKETE, a subject of the King of Hungary, residing at Detroit, county of Wayne, State of Michigan, have invented a certain new and useful Improvement in Spring-Shackles for Motor-Vehicles, of which the following is a specification, reference being had therein to the accompanying drawings.

My invention relates to spring shackles for automobiles and has for its object a more durable and safer construction than that heretofore in use.

In the manufacture and operation of automobiles, difficulty has been experienced because the side faces of the spring shackles, which are the links connecting the ends of the springs with the frame or with another spring, wear very rapidly and then become loose and rattle. This difficulty is particularly noticeable in automobiles having the so-called Hotchkiss drive in which the rear spring shackle is long and moves through a considerable arc. The wear on the side face of the spring shackle is caused by the spring or the frame, both of which are of harder material than the spring shackle, so that the spring shackle is gradually scored and cut, particularly when the vehicle is subjected to twisting strains and side shocks. Attempts have been made to remedy this difficulty by hardening the spring shackles, but when this is done, the shackles are rendered so brittle that they are easily broken and are therefore unsafe. When made of material which is tough enough to withstand the side shocks, the shackles wear rapidly, soon become loose and rattle and are a source of constant expense and annoyance to the users of cars.

My present invention has for its object to provide means to prevent this wear of the side face of the spring shackle so that the spring shackle may be made of tough unbreakable steel and at the same time will wear indefinitely, and if it ever becomes worn, may be easily and quickly renewed.

The invention will be fully understood from the following description when taken in connection with the accompanying drawings, and the novel features thereof will be pointed out and clearly defined in the claims at the close of this specification.

In the drawings, Figure 1 is a side elevation of the rear end of a spring and the horn of a frame of an automobile, said spring and horn being connected by a shackle embodying my invention.

Fig. 2 is a section on line 2—2 of Fig. 1.

Fig. 3 is a side elevation of one spring shackle.

Fig. 4 is a side elevation of the coöperating shackle bearing plate.

Fig. 5 is a side elevation and Fig. 6 is a section of the frame or spring bearing plate.

Referring now to the drawings, at 11 is shown the rear end of a horn forming part of the frame of an automobile which may be assumed to be supplied with the so-called Hotchkiss drive; 12 is the rear end of a spring; 13—13 are spring shackles secured to the horn 11 by the shackle bolt 14 and to the spring 12 by the shackle bolt 15. Each shackle 13 is provided on one face with two ribs or ledges $a$ and the parts are assembled so that the ledges $a$ of the two spring shackles face each other. This will be clearly seen from Fig. 2. At 17 is shown a bearing plate (see also Fig. 4) which is substantially circular but has a straight or slabbed-off edge, as shown at $b$ in Fig. 4. The bearing plate has a hole $c$ to receive the shackle bolt 14 or 15 as the case may be, and is of such a shape that when it is in place, its edge $b$ will lie in contact with one face of the ledge $a$ and thereby the bearing plate will be caused to move with the shackle 13. It will, therefore, practically form a part of the spring shackle when the parts are assembled, but is entirely separate from it when they are removed. At 18 is shown a coöperating bearing plate (see also Figs. 5 and 6) having two lugs $d$ and $e$ which engage the horn of the frame or the edge of the spring as the case may be. In either case, the bearing plate is held from movement relatively to the horn or spring and practically forms a part of it when the parts are assembled in the same way that the bearing plate 17 is practically a part of the spring shackle 13. All the parts are held in place by the shackle bolts 14 and 15 and the nuts 19 and 20. The two bearing plates 17 and 18 are made of hardened steel or other suitable material and are wear-resisting. Being preferably of the same hardness and presenting a smooth surface to each other, they wear imperceptibly and protect the spring shackles from all wear. As each of the two bearing plates is fixed to its respective member which is the spring shackle in one case and the horn or spring in the other, and as they separate the spring shackle from the other member, it is possible to make the spring shackle of as soft and tough material as may be desired without any danger of wear. The result is that the device has the necessary strength, but can be made to wear even more slowly than a case-hardened spring shackle. The device does not get loose nor rattle and is therefore much more satisfactory as well as more economical in action.

From the foregoing, it will be seen that my invention entirely eliminates the troubles heretofore arising from the cutting, scoring and rapid wearing of spring shackles and provides a construction which is also much safer.

What I claim is:

1. In combination with a frame or spring member and a shackle bolt, a spring shackle of relatively soft metal, a bearing plate of relatively hard metal surrounding the shackle bolt and secured to the frame or spring member, and a coöperating bearing plate in contact with the first plate and secured to the shackle.

2. In combination with a frame or spring member and a shackle bolt, a spring shackle of relatively soft metal, and two bearing plates of harder material interposed between them and secured respectively to the said two members so that they will oscillate with the members to which they are secured and will move relatively to each other.

3. In combination with a frame or spring member and a shackle bolt, a spring shackle of relatively soft material having a shoulder formed on the side, a bearing plate slabbed off to form a face for contact with the shoulder so that the said shackle and bearing plate will move together as one piece, and a coöperating bearing plate secured to the frame or spring member so that they will move together as one piece, both of said bearing plates being of relatively hard material and in contact with each other.

In testimony whereof I affix my signature.

S. I. FEKETE